(12) United States Patent
Klein

(10) Patent No.: US 11,505,217 B2
(45) Date of Patent: Nov. 22, 2022

(54) FLEXIBLE TRACK SYSTEM AND ROBOTIC DEVICE FOR THREE-DIMENSIONAL SCANNING OF CURVED SURFACES

(71) Applicant: The Boeing Company, Chicago, IL (US)

(72) Inventor: Michael K. Klein, Seattle, WA (US)

(73) Assignee: The Boeing Company, Chicago, IL (US)

( * ) Notice: Subject to any disclaimer, the term of this patent is extended or adjusted under 35 U.S.C. 154(b) by 874 days.

(21) Appl. No.: 16/401,808

(22) Filed: May 2, 2019

(65) Prior Publication Data
US 2020/0346668 A1 Nov. 5, 2020

(51) Int. Cl.
*B25J 5/02* (2006.01)
*B61B 13/02* (2006.01)
(Continued)

(52) U.S. Cl.
CPC .............. *B61B 13/02* (2013.01); *B25J 5/007* (2013.01); *B25J 5/02* (2013.01); *B25J 15/0019* (2013.01);
(Continued)

(58) Field of Classification Search
CPC ....... G01B 5/0004; G01B 11/24; B61C 11/04; B61C 9/38; B61B 13/02; B25J 5/02; B25J 15/0019; B25J 5/007; B25J 19/022; B25J 15/0608; B25J 19/04; B25J 9/1697; B25J 15/0616; B25J 19/023; B25J 15/06; B25J 15/0028; G06Q 30/0633; G06Q 10/087; B66F 9/065; B66F 9/07; B66F 9/063; B65G 1/1373; B65G 1/0492; B65G 2209/10; Y10S 901/01
See application file for complete search history.

(56) References Cited

U.S. PATENT DOCUMENTS 6,843,328 B2 1/2005 Boyl-Davis et al.
8,152,260 B2 4/2012 Baird et al.
(Continued)

OTHER PUBLICATIONS

Papadimitriou et al., An adaptable and self-calibrating service robotic scanner for ultrasonic inspection of nuclear nozzle-vessel welds, 2012, IEEE, p. (Year: 2012).*
(Continued)

*Primary Examiner* — Mcdieunel Marc
(74) *Attorney, Agent, or Firm* — McDonnell Boehnen Hulbert & Bergoff LLP

(57) ABSTRACT

An example robotic device includes: a circumferential carriage configured to drive the robotic device along a rail configured to be mounted to a curved surface, the circumferential carriage comprising: (i) a frame base, (ii) a frame mounted to the frame base, (iii) one or more wheels coupled to the frame base and configured to engage with the rail, (iv) a worm gear arrangement, and (v) a main drive gear coupled to the worm gear arrangement and configured to engage with a rack disposed on the rail; and a transversal carriage comprising: (i) a cross slide slidably mounted to the frame, (ii) a transversal rack coupled to the cross slide, (iii) a cross slide motor mounted to the circumferential carriage, and (iv) a cross slide drive gear coupled to the cross slide motor and having gear teeth engaging with respective teeth of the transversal rack.

20 Claims, 11 Drawing Sheets

(51) Int. Cl.
*B25J 15/00* (2006.01)
*B61C 11/04* (2006.01)
*G01B 11/24* (2006.01)
*B25J 5/00* (2006.01)
*B61C 9/38* (2006.01)

(52) U.S. Cl.
CPC .............. *B61C 11/04* (2013.01); *G01B 11/24* (2013.01); *B61C 9/38* (2013.01)

(56) References Cited

U.S. PATENT DOCUMENTS

| | | | |
|---|---|---|---|
| 10,549,915 B1* | 2/2020 | Theobald | B25J 13/06 |
| 11,235,890 B1* | 2/2022 | Dahlstrom | B64D 47/08 |
| 2018/0104829 A1* | 4/2018 | Altman | B25J 5/007 |
| 2021/0144885 A1* | 5/2021 | Enright | H05K 7/20236 |

OTHER PUBLICATIONS

Pearson et al., Non-circularcone beam CT trajectories: A preliminary investigation on a clinical scanner, 2010, IEEE, (Year: 2010).*
Larson et al., A robotic device for minimally invasive breast interventions with real-time MRI guidance, 2003, IEEE, (Year: 2003).*
Moura et al., Automation of Train Cab Front Cleaning With a Robot Manipulator, 2018, IEEE, p. 3058-3065 (Year: 2018).*

* cited by examiner

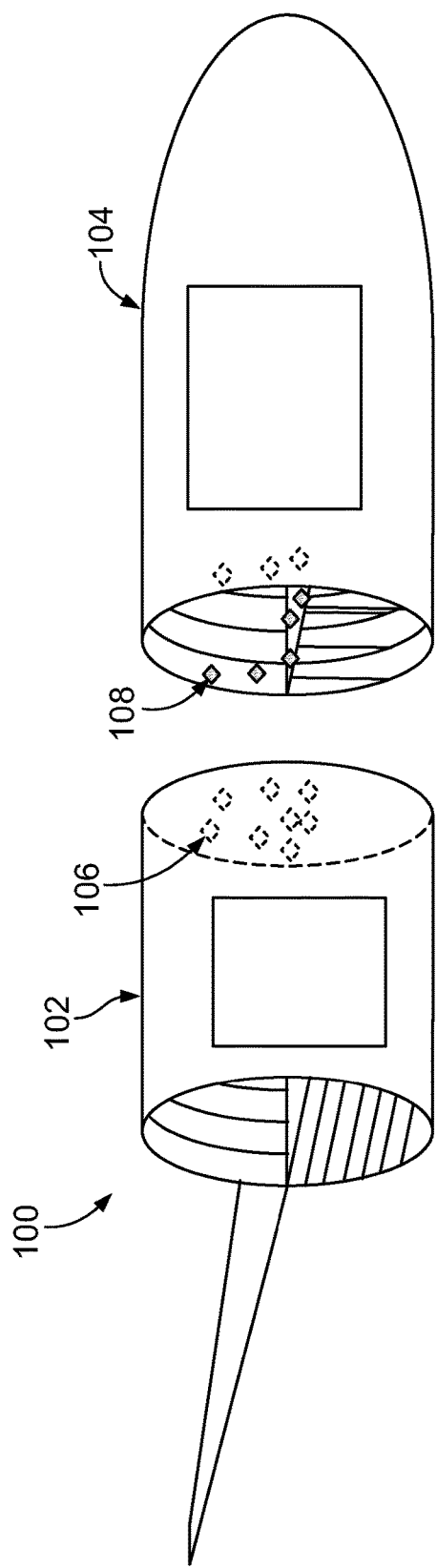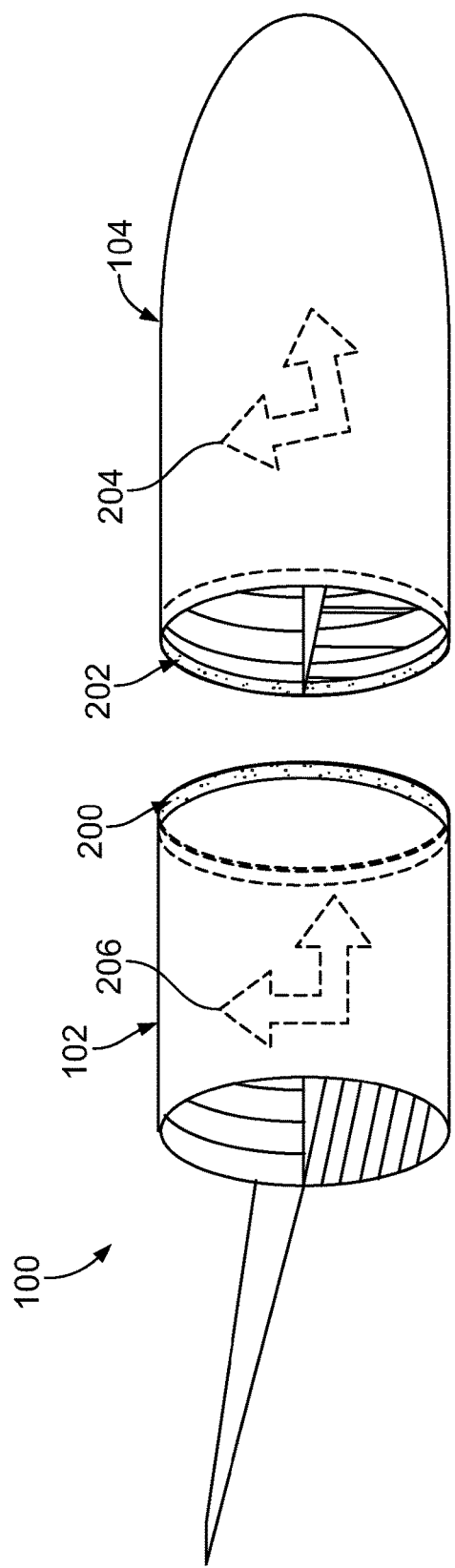

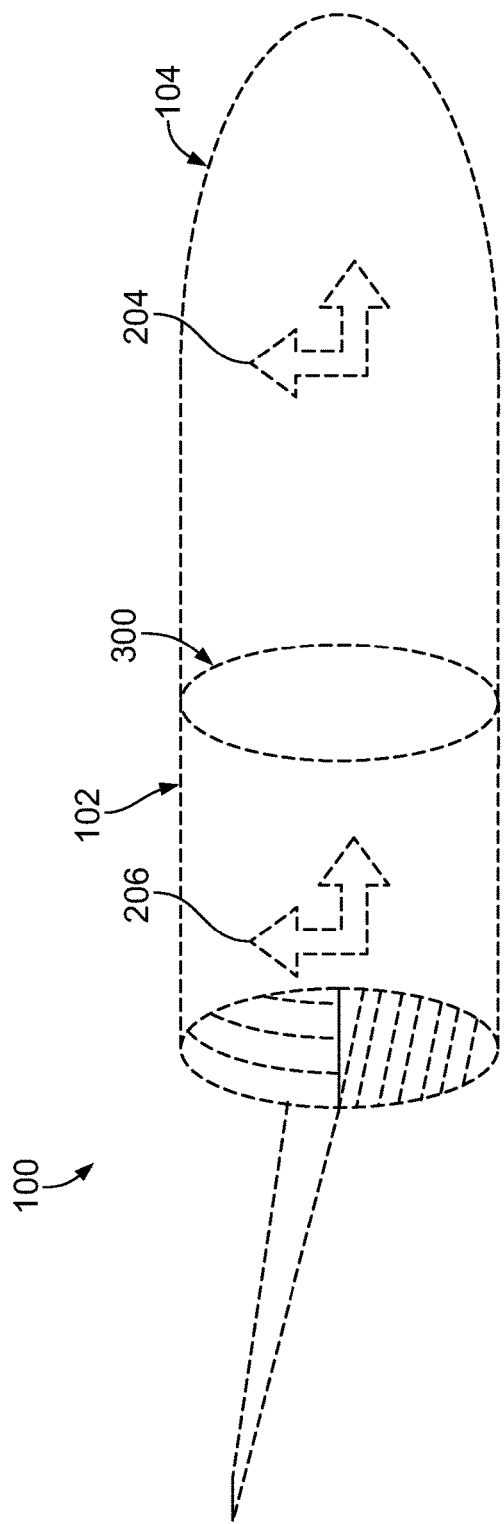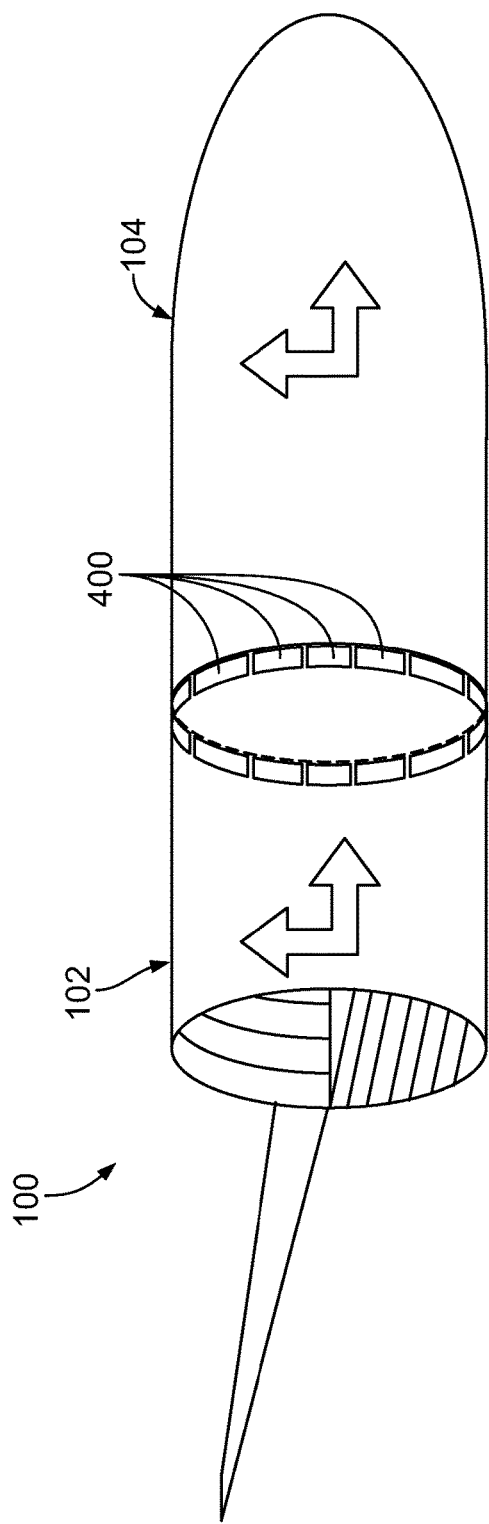

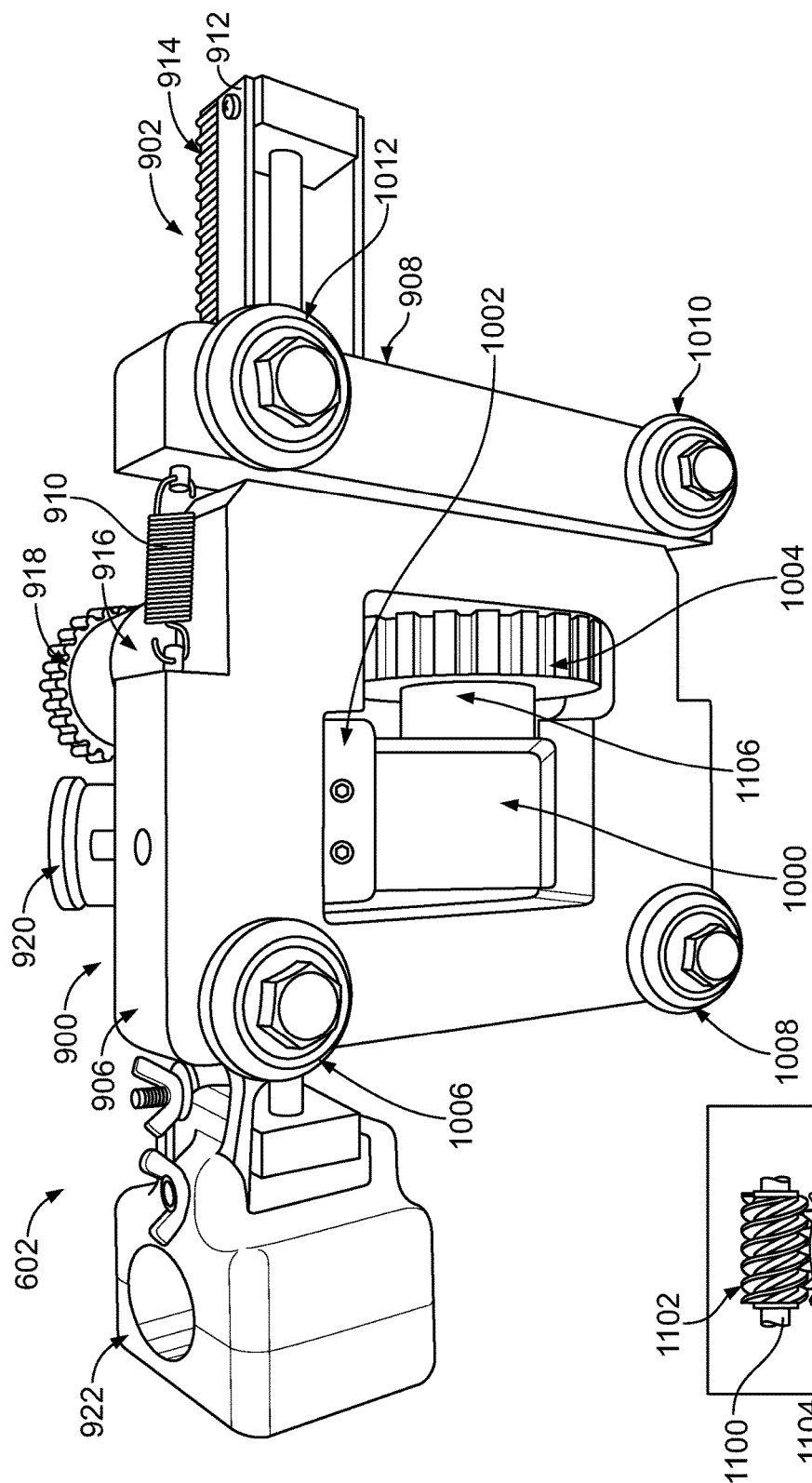
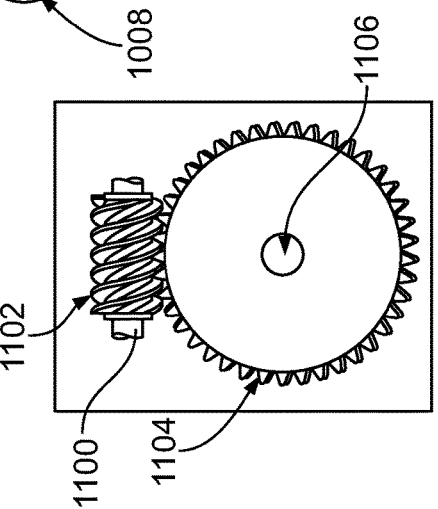
FIG. 10
FIG. 11

FLEXIBLE TRACK SYSTEM AND ROBOTIC DEVICE FOR THREE-DIMENSIONAL SCANNING OF CURVED SURFACES

FIELD

The present invention relates generally to scanning of curved surfaces. The invention relates more particularly to a flexible track system that allows a robotic device or apparatus to trace a curved surface with a scanner to generate a three-dimensional point cloud representing the curved surface.

BACKGROUND

Some applications involve scanning curved surfaces, e.g., with laser scanner, to generate a three-dimensional (3D) point cloud representing the curved surfaces relative to a global frame of reference. Conventional scanning systems involve an operator using a hand scanner to trace a curved surface. A tracker is typically placed at a reference point and emits a laser beam toward the hand scanner. The hand scanner can have reflecting surfaces (e.g., mirrors) that reflect the laser beam when the hand tracker is positioned in a particular orientation, enabling the tracker to determine the position and orientation of the hand scanner.

The operator holds the hand scanner in the particular orientation at a particular focal distance from the curved surface, and then the hand scanner emits another laser beam toward a point on the curved surface to determine location of that point in 3D space relative to the tracker. This process is repeated across the curved surface to generate the 3D point cloud.

However, manually holding the hand scanner, manually adjusting its orientation to the particular orientation, manually adjusting the distance from the surface to match the desired focal distance, and repeating this process across the surface being scanned can be a time-consuming process that increases the cost of manufacturing and assembly. It may thus be desirable to have a system having a robotic device to automate the scanning process and avoid manual adjustments to orientation, focal distance, and to generate a consistent scan of the curved surface. It is with respect to these and other considerations that the disclosure made herein is presented.

SUMMARY

The present disclosure describes examples that relate to a flexible track system and robotic device for three-dimensional scanning of curved surfaces.

In one aspect, the present disclosure describes a robotic device for scanning curved surfaces. The robotic device includes a circumferential carriage configured to drive the robotic device along a rail configured to be mounted to a curved surface, the circumferential carriage comprising: (i) a frame base, (ii) a frame mounted to the frame base, (iii) one or more wheels coupled to the frame base and configured to engage with the rail, (iv) a worm gear drive motor mounted to the frame, (v) a worm screw coupled to the worm gear drive motor, (vi) a worm wheel engaged with the worm screw, and (vii) a main drive gear coupled to the worm wheel and configured to engage with a rack disposed on the rail. The robotic device also includes a a transversal carriage comprising: (i) a cross slide slidably mounted to the frame of the circumferential carriage, (ii) a transversal rack coupled to the cross slide, (iii) a cross slide motor mounted to the circumferential carriage, and (iv) a cross slide drive gear coupled to the cross slide motor and having gear teeth engaging with respective teeth of the transversal rack to drive the transversal carriage in a transversal direction relative to the circumferential carriage.

In another aspect, the present disclosure describes a system for scanning a curved surface. The system includes a rail configured to be made of a flexible material to conform to curvature of the curved surface, wherein the rail comprises a rack having teeth. The system also includes a plurality of standoff mounts coupled to the rail and spaced along a length of the rail, wherein the plurality of standoff mounts are configured to mount the rail to the curved surface, such that the rail is disposed at a consistent distance from the curved surface. The system further includes a robotic device. The robotic device includes a circumferential carriage configured to drive the robotic device along the rail, the circumferential carriage comprising: (i) a frame base, (ii) a frame mounted to the frame base, (iii) one or more wheels coupled to the frame base and configured to engage with the rail, (iv) a worm gear drive motor mounted to the frame, (v) a worm screw coupled to the worm gear drive motor, (vi) a worm wheel engaged with the worm screw, and (vii) a main drive gear coupled to the worm wheel and configured to engage with the teeth of the rack of the rail. The robotic device also includes a transversal carriage comprising: (i) a cross slide slidably mounted to the frame of the circumferential carriage, (ii) a transversal rack coupled to the cross slide, (iii) a cross slide motor mounted to the circumferential carriage, and (iv) a cross slide drive gear coupled to the cross slide motor and having gear teeth engaging with respective teeth of the transversal rack to drive the transversal carriage in a transversal direction relative to the circumferential carriage.

In still another aspect, the present disclosure describes a method. The method includes mounting a robotic device to a rail disposed about a circumference of a curved surface, wherein the robotic device comprises: (i) a circumferential carriage configured to drive the robotic device along the rail, and (ii) a transversal carriage coupled to the circumferential carriage and configured to move in a transversal direction relative to the circumferential carriage, wherein a scanner is coupled to the transversal carriage. The method also includes driving the circumferential carriage about the circumference of the curved surface to scan the circumference via the scanner. The method further includes driving the transversal carriage to scan the curved surface in the transversal direction via the scanner.

The foregoing summary is illustrative only and is not intended to be in any way limiting.

In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 1 illustrates alignment of two sections of an aircraft, in accordance with an example implementation.

FIG. 2 illustrates lead portions of sections of an aircraft, in accordance with an example implementation.

FIG. 3 illustrates digital alignment of three-dimensional (3D) point clouds of curved surfaces of the sections illustrated in FIG. 2, in accordance with an example implementation.

FIG. 4 illustrates shimming when the sections of FIG. 2 are assembled, in accordance with an example implementation.

FIG. 10 illustrates a bottom perspective view of a robotic device, in accordance with an example implementation.

FIG. 11 illustrates a schematic representation of a worm gear arrangement disposed in a worm gear housing, in accordance with an example implementation.

DETAILED DESCRIPTION

Figure 5:
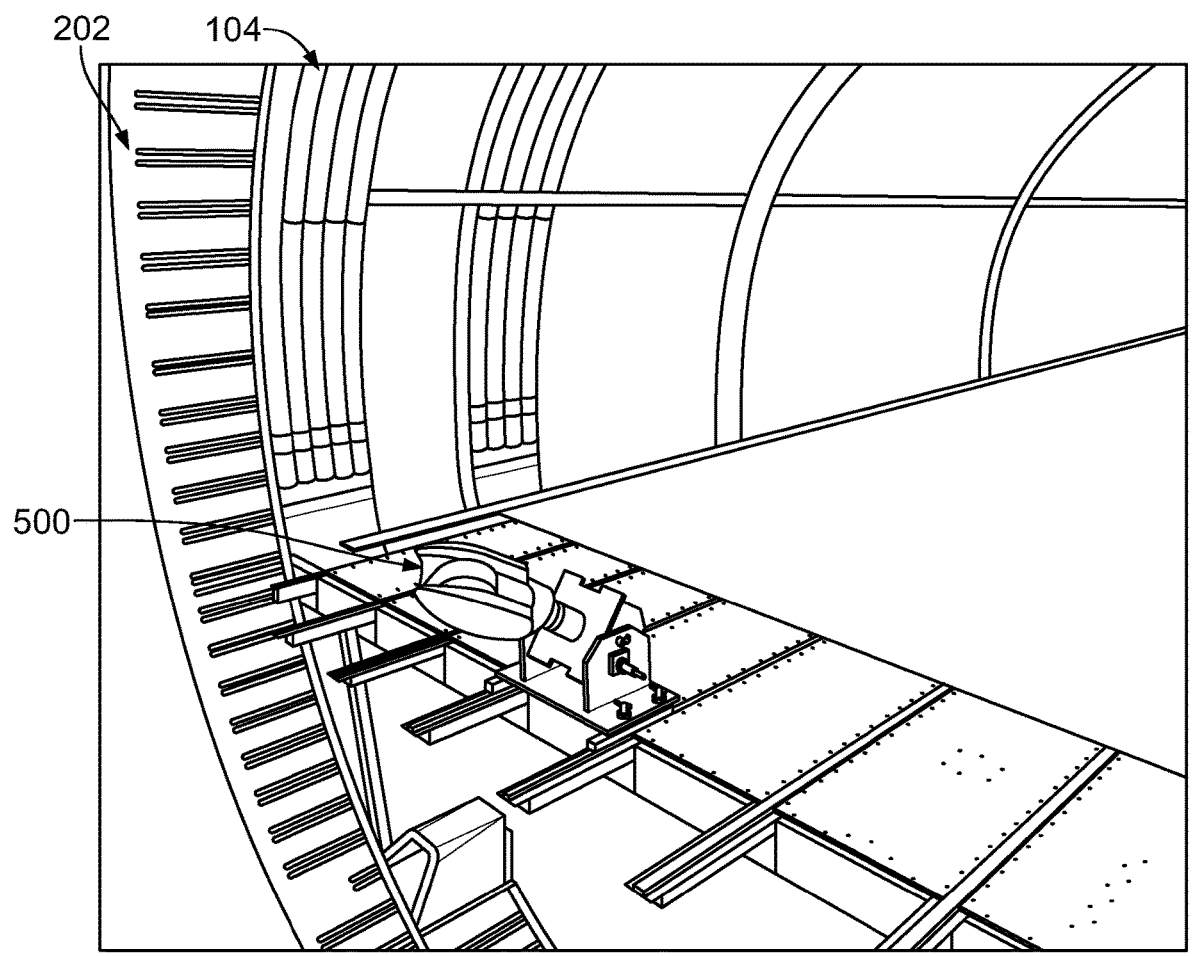
FIG. 5 illustrates a tracker disposed within a section of an aircraft, in accordance with an example implementation.

Within examples, disclosed herein are systems having a robotic device to automate a scanning process and avoid manual adjustments to orientation, focal distance, and to generate a consistent scan of a curved surface in a time- and cost-efficient manner. Such system can facilitate generating a 3D point cloud of the curved surface. A 3D point cloud is a set of data points in space representing coordinates of points on a surface of an object. The 3D point cloud can be generated by a 3D scanner configured to measure a large number of points on the surface of the object being scanned relative to a particular coordinate system.

In examples, curved surfaces of mating components of a machine or vehicle are joined together such that one inner curved surface is disposed within an outer curved surface. If gaps exist between the surfaces, shims can be used to fill such gaps. Generating 3D point clouds of mating curved surfaces can facilitate determining gaps sizes and making the shims that fill the gaps prior to assembling the components of the machine or vehicle. This way, assembly time can be reduced. This process can be referred to as predictive shimming. In the description provided herein, an aircraft is used as an example. However, it should be understood that the systems, devices, apparatuses, and methods described herein are applicable to other machines and vehicles having curved surfaces (e.g., a spacecraft, a submarine, etc.).

FIG. 1 illustrates alignment of two sections of an aircraft 100, in accordance with an example implementation. The aircraft 100 can have a first section 102 (e.g., body section) and a second section 104 (e.g., a nose section) that are to be joined together to form a portion of a fuselage of the aircraft 100. As shown in FIG. 1, the sections 102, 104 of the aircraft 100 can be generally cylindrical in shape and have curved surfaces. Each section of the sections 102, 104 can have alignment points that are to be aligned longitudinally prior to joining the sections 102, 104 together during assembly of the aircraft 100.

For example, the first section 102 can have alignment points such as an alignment point 106 and the second section 104 can have alignment points such as an alignment point 108. These alignment points can be digitally recorded. Their position can be recorded in 3D space. The alignment points can facilitate orienting the scan data to particular datums.

The sections 102, 104 can be digitally translated (e.g., moved in x, y and z directions of a Cartesian coordinate system) and rotated (e.g., in roll, pitch, and yaw rotational directions) until the alignment points 106, 108 are longitudinally aligned prior to assembling the sections 102, 104 to each other. This way, the sections 102, 104 can be aligned to their designed datums established in the manufacturing plans. Once digital alignment has been established, the sections 102, 104 can then be physically assembled where one of the sections 102, 104 (e.g., the section 104) can be partially inserted into the other section (e.g., the section 102) to assemble the sections 102, 104 together.

FIG. 2 illustrates lead portions of the sections 102, 104, in accordance with an example implementation. Each of the sections 102, 104 can have a skin or outer surface mounted to a frame. The first section 102 can have a lead portion 200 that is configured to be inserted into a lead portion 202 of the second section 104 such that skin of the second section 104 aligns with a respective skin of the first section 102. For example, the lead portion 200 of the first section 102 can have "tongues" or tabs that, when the alignment points of the sections 102, 104 are longitudinally-aligned, can be inserted into guiding channels disposed in the lead portion 202 of the second section 104 until the skins of the sections 102, 104 meet to form a continuous aircraft body or fuselage.

When the lead portion 200 of the first section 102 is inserted into the lead portion 202 of the second section 104, gaps can exist between an exterior peripheral surface of the lead portion 200 and an interior peripheral surface of the lead portion 202 due to manufacturing tolerances (e.g., out-of-roundness tolerances). Such gaps can be later filled with shims. However, waiting until assembly of the sections 102, 104 to measure the gaps and make the shims to fill them can be inefficient and can increase assembly and manufacturing time and cost.

To enhance the efficiency of the assembly process, curved surfaces of the lead portions 200, 202 can be scanned ahead of assembly with a scanner that can generate a 3D point cloud representing the curved surfaces relative to a global coordinate system, reference frame. In examples, the curved surfaces of the lead portions 200, 202 can be scanned separately relative to different reference frames. For instance, a 3D point cloud of the lead portion 200 can be generated relative to a reference frame 204, whereas a respective 3D point cloud of the lead portion 202 can be generated relative to a reference frame 206.

Because the scans can be performed separately, the reference frames 204, 206 can be skewed relative to predetermined or designed datums. For instance, as depicted schematically in FIG. 2, the reference frame 204 is skewed. The 3D point clouds can, however, be aligned digitally using a computing device by aligning the reference frames 204, 206 to the designed datums to remove skewness of the reference frames 204, 206.

FIG. 3 illustrates digital alignment of 3D point clouds of the curved surfaces of the sections, in accordance with an example implementation. The 3D point clouds generated for the lead portions 200, 202 can be input to a computing device, which can then align the 3D clouds such that the outer surfaces of the sections 102, 104 meet at a contact line 300. Outer surfaces of the sections 102, 104 and the contact line 300 are shown in FIG. 3 with dashed lines to indicate that alignment of the sections 102, 104 is done digitally via the computing device as opposed to physically assembling the sections 102, 104 at this stage. As shown in FIG. 3, once the computing device aligns the 3D point clouds, the reference frame 204 is no longer skewed.

Once the 3D point clouds are aligned as shown in FIG. 3, the computing device can determine whether radial gaps exist between the interior peripheral surface of lead portion 202 of the second section 104 and the exterior peripheral surface of the lead portion 200 of the first section 102. The computing device can further determine dimensions of such gaps if they exist. As such, shims can be made ahead of assembly such that when the sections 102, 104 are assembled, the shims are ready to be inserted in the gaps to complete assembly of the sections 102, 104.

FIG. 4 illustrates shimming when the sections 102, 104 are assembled, in accordance with an example implementation. The computing device can determine sizes of the gaps between the sections 102, 104, and can accordingly determine sizes of shims 400 to be disposed in the gaps upon assembly. In an example, the computing device can generate computer aided design (CAD) models of the shims 400, and the CAD models can be used to manufacture the shims that are to be placed in the gaps upon assembly.

As mentioned above with respect to FIG. 2, curved surfaces of the lead portions 200, 202 can be scanned to generate the 3D point clouds of the lead portions 200, 202. A scanner can be used to trace the curved surfaces and determine coordinates of points on the curved surfaces relative to a tracker positioned at an origin of the coordinate system in which the 3D point cloud is generated.

FIG. 5 illustrates a tracker 500 disposed within the second section 104, in accordance with an example implementation. The tracker 500 can be referred to as an absolute reference tracker and is positioned at a central location or position representing an origin of a coordinate system in which the 3D point cloud of the interior peripheral surface of the lead portion 202 of the second section 104 is generated. Particularly, the tracker 500 is configured to be communicatively coupled to a scanner used to trace the interior peripheral surface of the lead portion 202 while being tracked by the tracker 500 so as to enable generation of the 3D point cloud representing the coordinates of the points being scanned by the scanner relative to the tracker 500. The coordinate system can be Cartesian, radial, or spherical, as examples.

In an example, to trace the curved surface of the lead portion 202, an operator can use a hand scanner to trace the curved surface of the lead portion 202 (or the exterior curved surface of the lead portion 200 of the first section 102). In an example, the tracker 500 can emit a laser beam toward the hand scanner. The hand scanner can have reflecting surfaces (e.g., mirrors) that reflect the laser beam when the hand tracker is positioned in a particular orientation, enabling the tracker 500 to determine the position and orientation of the hand scanner. The operator holds the hand scanner in the particular orientation at a particular focal distance from the curved surface of the lead portion 200, and then the hand scanner emits another laser beam toward a point on the curved surface to determine location of that point in 3D space relative to the tracker 500. This process is repeated across the curved surface to generate the 3D point cloud.

However, manually holding the hand scanner, manually adjusting its orientation to the particular orientation, manually adjusting the distance from the surface to match the desired focal distance, and repeating this process across the surface being scanned can be a time-consuming process that increases the cost of manufacturing and assembly. It may thus be desirable to have a system having a robotic device to automate the scanning process and avoid manual adjustments to orientation, focal distance, and to generate a consistent scan of the curved surface.

Figure 6:
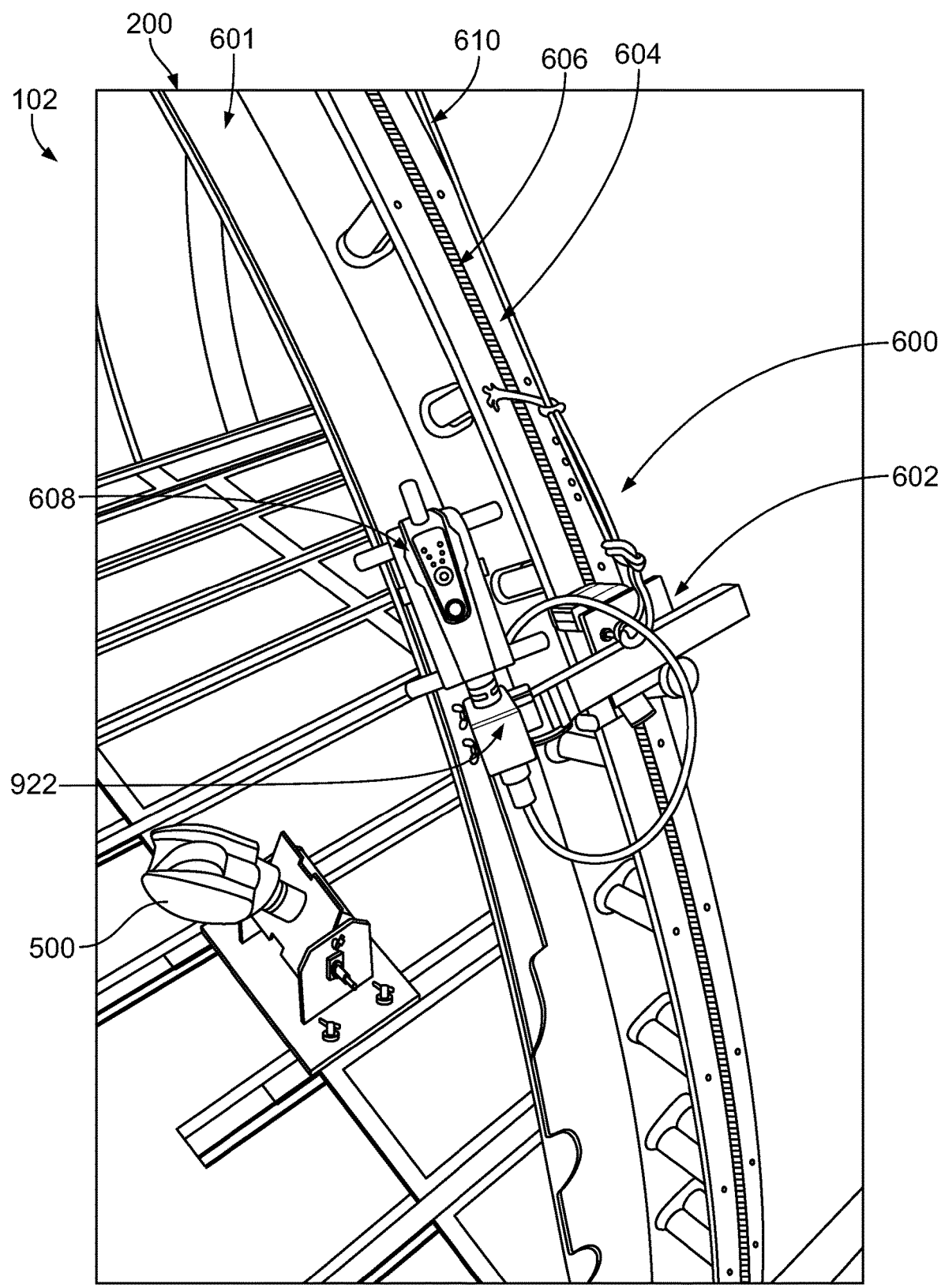
FIG. 6 illustrates a flexible track system having a robotic device for 3D scanning of a curved surface, in accordance with an example implementation.

FIG. 6 illustrates a flexible track system 600 having a robotic device 602 for 3D scanning of a curved surface 601, in accordance with an example implementation. The flexible track system 600 is shown mounted to the curved surface 601 (i.e., the exterior peripheral surface) of the lead portion 200 of the first section 102 as an example.

The flexible track system 600 can have a track or rail 604 that is configured to be flexible or bendable along its length such that the rail 604 can conform to curvature of the curved surface 601 of the section 102 being scanned. For example, the rail 604 can be made of a bendable or flexible material such as composites, thin metals, high density polyethylene (HDPE), etc. The rail 604, however, is substantially stiff in a direction parallel to the curved surface 601 being scanned (i.e., direction along a longitudinal axis of the aircraft 100).

In an example, the rail 604 can be divided into multiple rail segments. The rail segments can then be joined together via rail connectors.

Figure 7:
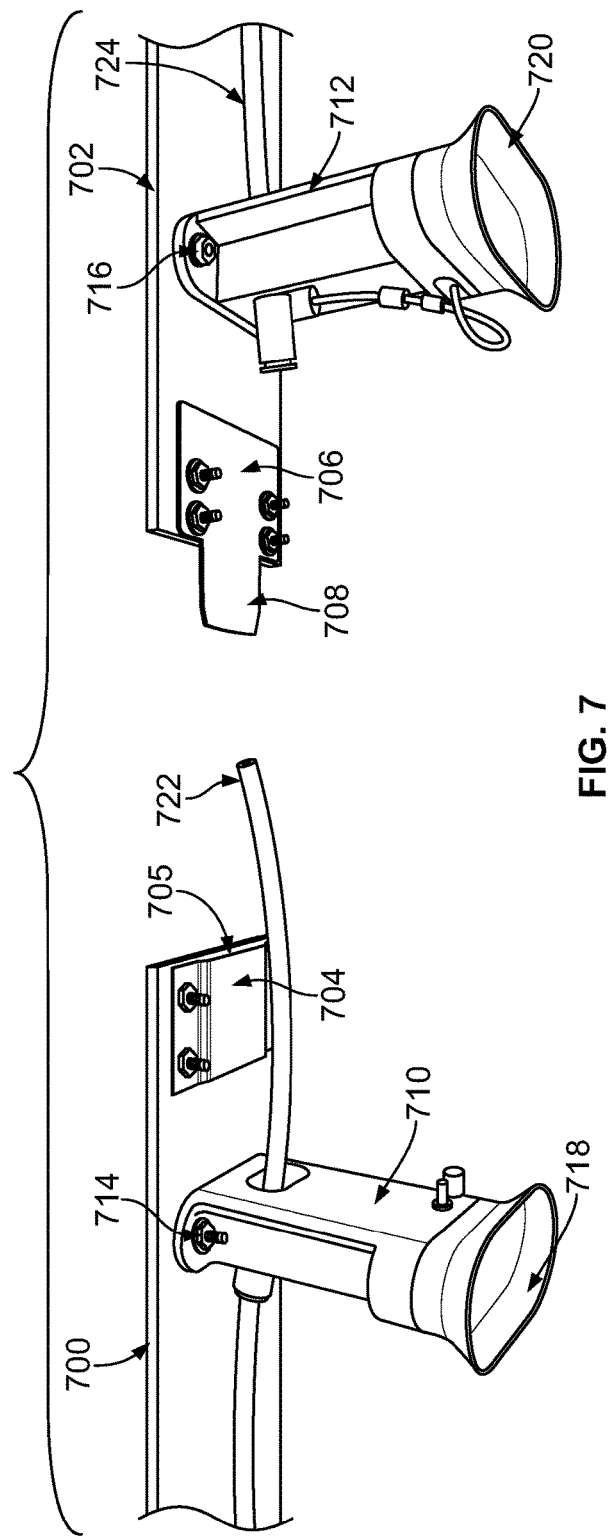
FIG. 7 illustrates a partial bottom perspective view of a first rail segment and a second rail segment of a rail, in accordance with an example implementation.

FIG. 7 illustrates a partial bottom perspective view of a first rail segment 700 and a second rail segment 702 of the rail 604, in accordance with an example implementation. Having the rail 604 composed of multiple rail segment including the two rail segments 700, 702 provides for versatility, as the rail 604 can be adapted to different size aircraft sections or different circumferences of curved surfaces.

As depicted in FIG. 7, the first rail segment 700 has a rail connector 704 affixed thereto. The rail connector 704 is configured as a bracket having a slot 705. The second rail segment 702 similarly has a rail connector 706 affixed thereto and configured to engage with the rail connector 704. Particularly, the rail connector 706 has a tab 708 that is inserted into the slot 705 of the rail connector 704 so as to join the rail segment 702 to the rail segment 700.

Once the tab 708 is inserted into the slot 705, a thumb screw or other fastener configurations can be used to secure the tab 708 in the slot 705. Once the rail connectors 704, 706 are coupled via the tab 708 and the slot 705, the rail segments 700, 702 align tangentially and form a continuum that can be traversed by the robotic device 602 as described in detail below.

In examples, the rail 604 can be mounted to the curved surface 601 via standoff mounts. Referring to FIG. 7, for example, the rail segment 700 can have a standoff mount 710 coupled thereto and the rail segment 702 can have a standoff mount 712 coupled thereto. The standoff mount 710 can be coupled to the rail segment 700 via fasteners such as fastener 714, and the standoff mount 712 can be coupled to the rail segment 702 via fasteners such as fastener 716.

Figure 8:
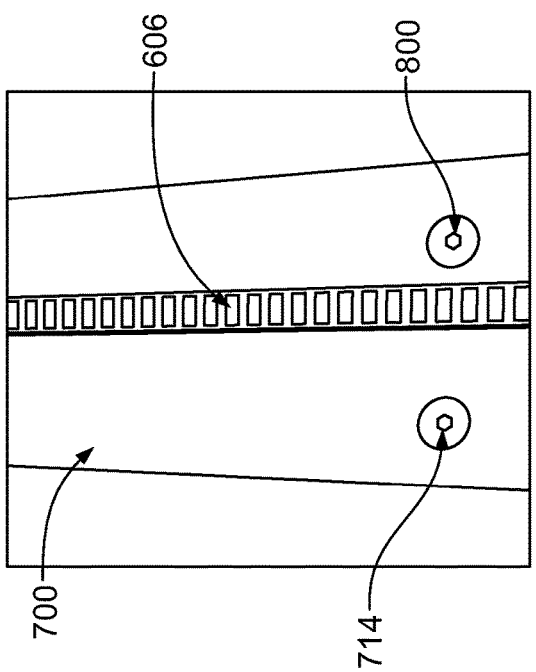
FIG. 8 illustrates a partial top perspective view of a rail segment, in accordance with an example implementation.

FIG. 8 illustrates a partial top perspective view of the rail segment 700, in accordance with an example implementation. As shown, the standoff mount 710 can be mounted or coupled to the rail segment 700 via the fastener 714 and fastener 800.

Referring back to FIG. 7, the standoff mounts 710, 712 are configured to mount the rail segments 700, 702 to the curved surface 601. Particularly, the standoff mount 710 can have a vacuum cup 718 that can secure the rail segment 700 to the curved surface 601, and the standoff mount 710 can have a vacuum cup 720 that can secure the rail segment 702 to the curved surface 601. With this configuration, respective vacuum cups similar to the vacuum cups 718, 720 can be spaced along a length of the rail 604 to mount the various connected rail segments to the curved surface 601. As such, the vacuum cups are releasably affixed at spaced intervals along the length of the rail 604. This way, the standoff mounts ensure that the rail 604 is disposed at a consistent distance from the curved surface 601.

The flexible track system 600 can, for example, have a compressed air supply system (e.g., including a pump and fluid reservoir) configured to provide compressed air via tubes or hoses such as hoses 722, 724 to the standoff mounts 710, 712. The standoff mounts 710, 712 can each have a Venturi system such that as compressed air flows through a restriction or constricted section of the Venturi system, a reduction in pressure occurs therein, thereby generating a low pressure vacuum environment between the vacuum cups 718, 720 and the curved surface 601 to which the rail 604 is mounted. Atmospheric pressure around the vacuum cups 718, 720 then pushes against the low pressure vacuum environment between the vacuum cups 718, 720 and the curved surface 601, thereby applying a force to the vacuum cups 718, 720 toward the curved surface 601 and securing the standoff mounts 710, 712 thereto. In additional or alternative to using a Venturi system, a vacuum generating device can be used to generate a vacuum environment between the vacuum cups 718, 720 and the curved surface 601 to which the rail 604 is mounted.

Referring back to FIG. 6, the rail 604 can have a rack 606 of a rack-and-pinion arrangement. The rack 606 can also be referred to as a belt or timing belt and is configured to have teeth that engage with corresponding teeth of a pinion or drive gear of the robotic device 602 as described below. As the drive gear rotates while engaged with the rack 606, the robotic device 602 traverses the rail 604 circumferentially (i.e., about a circumference of the curved surface 601). The rack 606 can be separate component that is affixed to the rail 604 or can be integral to the rail 604.

Figure 9:
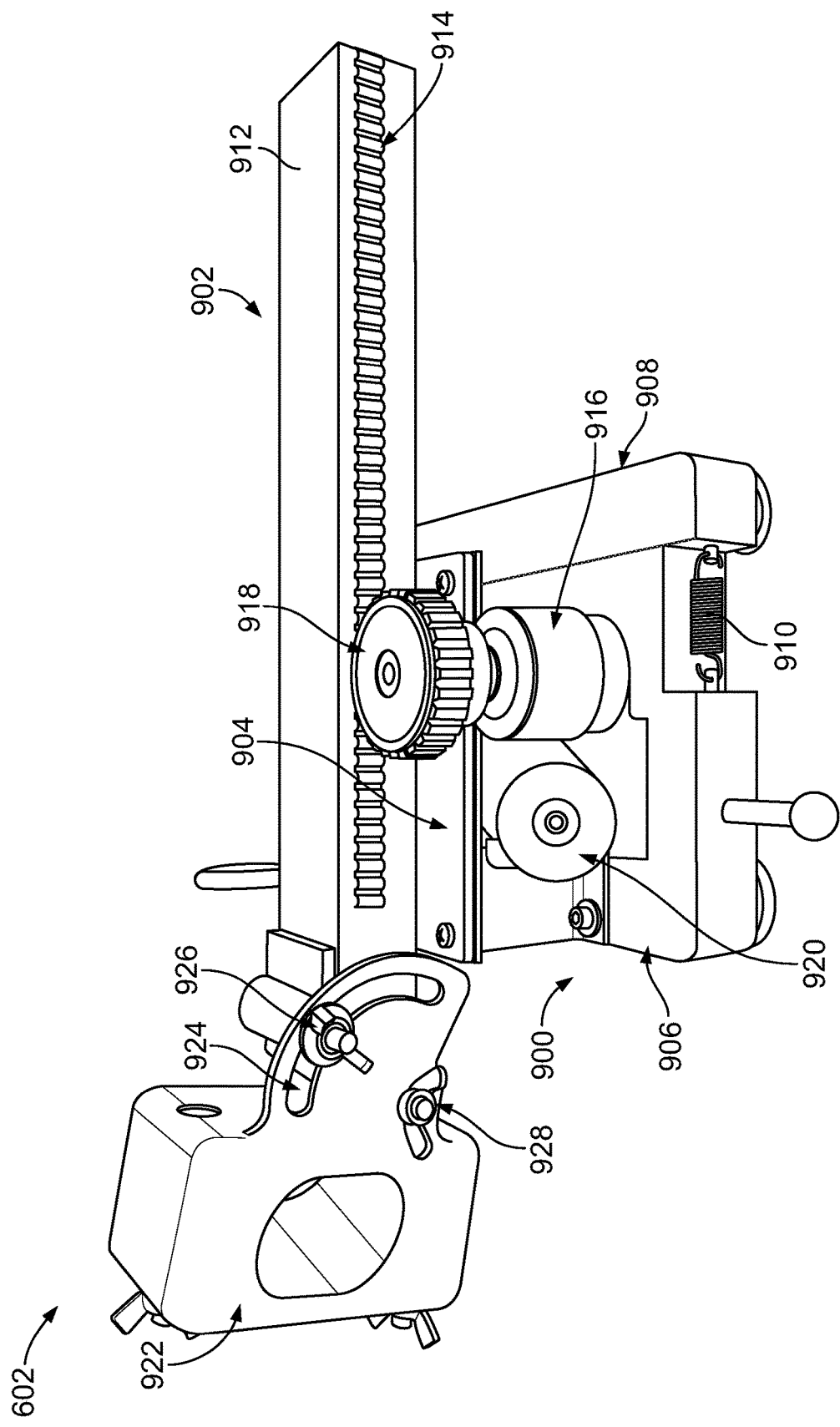
FIG. 9 illustrates a perspective top view of a robotic device, in accordance with an example implementation.

FIG. 9 illustrates a perspective top view of the robotic device 602, in accordance with an example implementation. The robotic device 602 has a circumferential carriage 900 and a transversal carriage 902. The circumferential carriage 900 is configured to move the robotic device 602 circumferentially about the curved surface 601 being scanned, whereas the transversal carriage 902 is configured to cross slide across the curved surface 601 of the lead portion 200 in a direction of a longitudinal axis of the aircraft 100 (i.e., longitudinal axis of section 102).

The circumferential carriage 900 includes a frame 904 mounted to a frame base 906. The circumferential carriage 900 further includes a retaining base 908 that is flexibly coupled to the frame base 906 via extension springs such as extension spring 910. With this configuration, the retaining base 908 and the frame base 906 can be pulled apart to mount the robotic device 602 to the rail 604, and then released to securely engage the robotic device 602 to the rail 604 as described in detail below.

The transversal carriage 902 includes a cross slide 912 slidably mounted to the frame 904. The transversal carriage 902 further includes a transversal rack 914 of another rack-and-pinion arrangement. The transversal rack 914 is coupled or attached to the cross slide 912. The robotic device 602 includes a cross slide motor 916 (e.g., an electric motor such as a brushless direct-current motor or similar actuator) affixed or coupled to the frame base 906. The cross slide motor 916 is configured to drive a cross slide drive gear 918. In other words, an output shaft of the cross slide motor 916 is coupled or drivingly connected to the cross slide drive gear 918, such that as the cross slide motor 916 is actuated, the cross slide drive gear 918 rotates or spins.

As depicted, the transversal rack 914 has teeth configured to engage with corresponding gear teeth of the cross slide drive gear 918. The cross slide 912 is slidably mounted to the frame 904, whereas the cross slide motor 916 is affixed to the frame base 906. With this configuration, when the cross slide motor 916 is actuated, the cross slide drive gear 918 spins, thereby moving the transversal rack 914 along with the cross slide 912 coupled thereto transversely or cross-wise (e.g., to the left or right in FIG. 9) relative to the frame 904.

The robotic device 602 further includes a worm gear drive motor 920 (e.g., an electric motor such as a brushless direct-current motor or similar actuator) coupled to the frame 904. The worm gear drive motor 920 is disposed at an angle relative to the frame 904 and is configured to drive a worm gear arrangement to drive the circumferential carriage 900 along the rack 606 of the rail 604.

FIG. 10 illustrates a bottom perspective view of the robotic device 602, in accordance with an example implementation. The worm gear drive motor 920 is coupled to a worm gear housing 1000. The worm gear housing 1000 is coupled to the frame base 906 via a bracket 1002. The bracket 1002 can, for example, be an L-shaped bracket having a first side coupled or fastened to the frame base 906 and a second side coupled or fastened to the worm gear housing 1000, thereby affixing the worm gear housing to the frame base 906.

FIG. 11 illustrates a schematic representation of a worm gear arrangement disposed in the worm gear housing 1000, in accordance with an example implementation. The worm gear drive motor 920 can have an output shaft 1100 that rotates when the worm gear drive motor 920 is activated. The output shaft 1100 of the worm gear drive motor 920 is coupled or drivingly connected to a worm screw 1102 configured to have helical or spiral threads.

The worm screw 1102 meshes with a worm wheel 1104 configured as a spur gear, for example. The helical threads of the worm screw 1102 are butted up against teeth of the worm wheel 1104. As the worm gear drive motor 920 is activated and the output shaft 1100 rotates, they apply a rotational power to the worm screw 1102. The worm screw 1102 then rotates against the worm wheel 1104, and the threads of the worm screw 1102 pushes on the teeth of the worm wheel 1104, thereby causing the worm wheel 1104 to rotate.

This arrangement changes rotational movement or the plane of movement of the worm screw 1102 by 90 degrees to the worm wheel 1104. The worm wheel 1104 is mounted to a shaft 1106 such that as the worm wheel 1104 rotates, the shaft 1106 also rotates. With this configuration, the shaft 1106 can have a reduced rotational speed compared to the worm screw 1102; however, the torque transmitted to the shaft 1106 is higher than the torque applied to the worm screw 1102.

Referring back to FIG. 10, the shaft 1106 in turn is coupled to a main drive gear 1004. As the shaft 1106 rotates, the main drive gear 1004 also rotates. The main drive gear 1004 can be configured as a spur gear, the teeth of which are configured to engage teeth of the rack 606 of the rail 604. As such, as the main drive gear 1004 rotates, the robotic device 602 moves along the rail 604 about a circumference of the curved surface 601 being scanned.

To facilitate movement of the robotic device 602 along the rail 604, the robotic device 602 can include a first wheel 1006 and a second wheel 1008 coupled to the frame base 906. Further, the robotic device 602 can include respective wheels such as a third wheel 1010 and a fourth wheel 1012 coupled to the retaining base 908.

The wheels 1006-1012 are configured as V-groove bearings configured to engage edges of the rail 604 to facilitate linear motion of the robotic device 602 along the rail 604. Particularly, the rail 604 can have chamfered edges configured to be received within V-shaped grooves of the wheels 1006-1012, so as to retain the robotic device 602 to the rail 604 and facilitate linear motion of the robotic device 602.

Figure 12:
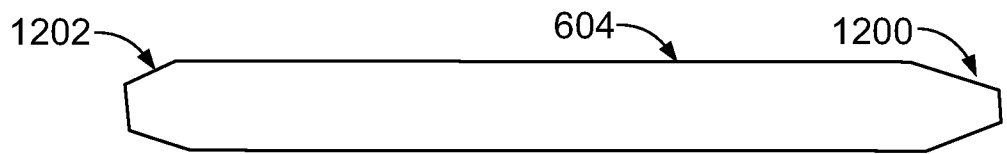
FIG. 12 illustrates a cross-sectional view of a rail, in accordance with an example implementation.
Figure 13:
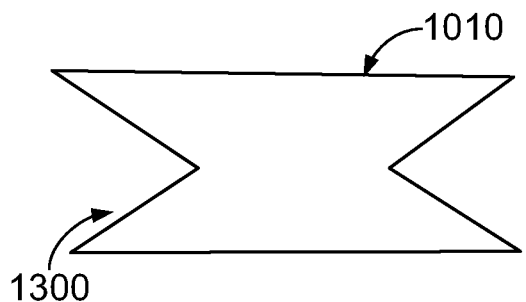
FIG. 13 illustrates a cross-sectional view of a wheel, in accordance with an example implementation.

FIG. 12 illustrates a cross-sectional view of the rail 604, and FIG. 13 illustrates a cross-sectional view of the wheel 1010, in accordance with example implementations. FIGS. 12-13 are illustrative and are not drawn to scale. The wheels 1006, 1008, and 1012 can be configured similar to the wheel 1010.

As depicted in FIG. 12, the rail 604 can have chamfered edges 1200 and 1202. The chamfered edges 1200, 1202 can be configured as symmetrical sloping or narrowing edges. Further, the wheel 1010 has a V-shaped groove 1300 having a profile (e.g., slope angles) that matches with or corresponds to the profile (e.g., slope angles) of the chamfered edge 1200. As such, the wheel 1010 is configured to receive the chamfered edge 1200 within the V-shaped groove 1300. The wheel 1008 is configured to receive the chamfered edge 1202 within its respective V-shaped groove. The wheels 1006 and 1012 are also configured to engage with the chamfered edges 1202, 1200 respectively, in a similar manner.

Referring back to FIG. 10, to mount the robotic device 602 to the rail 604, the retaining base 908 can be pulled away from the frame base 906, thereby stretching the extension spring 910. The retaining base 908 can be pulled away and the extension spring 910 can be stretched until the distance between the wheels 1006, 1008 and the wheels 1010, 1012 matches a width of the rail 604. The robotic device 602 can then be "dropped" onto the rail 604 such that the chamfered edges 1200, 1202 are respectively aligned with the V-shaped grooves of the wheels 1006-1012.

The frame base 906 can be moved toward the rail 604 such that the chamfered edge 1202 of the rail 604 is received within the V-shaped grooves of the wheels 1006, 1008. The retaining base 908 can then be released, and the extension spring 910 exerts a pulling force on the retaining base 908 toward the frame base 906, thereby causing the chamfered edge 1200 to be received within the V-shaped grooves of the wheels 1010, 1012 and tightly retaining the robotic device 602 to the rail 604. As the robotic device 602 is mounted to the rail 604, it may be desirable to apply a force on the main drive gear 1004 toward the rack 606 so as to maintain engagement therebetween as the robotic device 602 traverses the rail 604.

Figure 14:
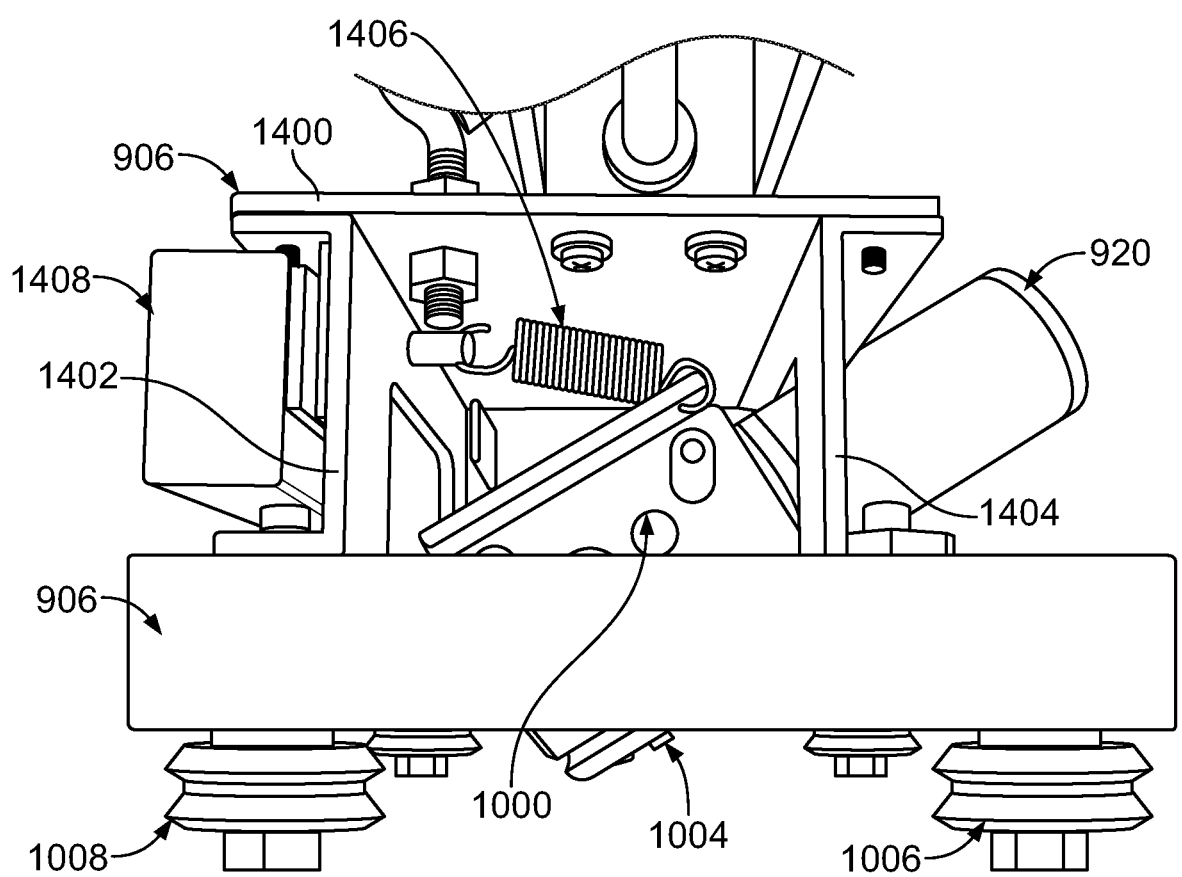
FIG. 14 illustrates a partial left side view of a robotic device, in accordance with an example implementation.

FIG. 14 illustrates a partial left side view of the robotic device 602, in accordance with an example implementation. As depicted in FIG. 14, the frame 904 can include a plate 1400 mounted to a first C-beam 1402 and a second C-beam 1404. While the plate 1400 is mounted to one side of the C-beams 1402, 1404, the other side of the C-beams 1402, 1404 is affixed to the frame base 906. The worm gear drive motor 920 is disposed through the C-beam 1404 to engage the worm gear housing 1000. The worm gear drive motor 920 and the worm gear housing 1000 are disposed at an angle as depicted in FIG. 14, and the main drive gear 1004 protrudes downward from the frame base 906 to engage the rack 606 of the rail 604.

To maintain a retaining force on the main drive gear 1004 toward the rack 606, the robotic device 602 can include one or more extension springs such as an extension spring 1406 having a first end coupled to the worm gear housing 1000 and a second end attached to the C-beam 1402. Due to the inclination of the worm gear housing 1000, the extension spring 1406 applies a torque in a counter-clockwise direction from the perspective of FIG. 14 on the worm gear housing 1000. The torque is in turn applied to the main drive gear 1004 to press thereon toward the rack 606 and maintain engagement with the rack 606.

With this configuration, as the robotic device 602 traverses the rail 604 and reaches a bottom portion of the lead portion 200 such that gravity applies a force that tends of disengage the main drive gear 1004 from the rack 606, the extension spring 1406 and the torque applied thereby can ensure that engagement between the main drive gear 1004 from the rack 606 is maintained. As such, main drive gear 1004 might not "skip" any of the teeth of the rack 606.

Referring back to FIG. 9, the robotic device 602 further includes scanner mount 922 that is coupled to the cross slide 912. Position and orientation of the scanner mount 922 are adjustable. For example, the scanner mount 922 can have a radial channel or radial slot 924 and can be coupled to the cross slide 912 via a tilt adjustment fastener 926 disposed in the radial slot 924. The scanner mount 922 is further pivotably coupled to the cross slide 912 via a pivot fastener 928. To adjust orientation of the scanner mount 922, for example, the tilt adjustment fastener 926 and the pivot fastener 928 can be loosened, and the scanner mount 922 can then be rotated to a desired orientation as the position of the tilt adjustment fastener 926 within the radial slot 924 changes. The tilt adjustment fastener 926 and the pivot fastener 928 can be re-tightened once the desired orientation is reached.

Referring back to FIG. 6, a scanner 608 can be mounted to the robotic device 602 via the scanner mount 922. The standoff mounts, such as the standoff mounts 710, 712 described above with respect to FIG. 7, can ensure that the scanner 608 is positioned at a particular desirable focal distance from the curved surface 601 of the lead portion 200. Further, the orientation of the scanner 608 can be adjusted via the tilt adjustment fastener 926 and the pivot fastener 928. As such, the orientation of the scanner 608 can be adjusted as desired until reflective surfaces o (e.g., mirrors) of the scanner 608 are in a position that is detectable by the tracker 500. Once the position and orientation of the scanner 608 are adjusted to a desirable position and orientation, the robotic device 602 can be actuated to traverse the rail 604 circumferentially and transversely.

Figure 15:
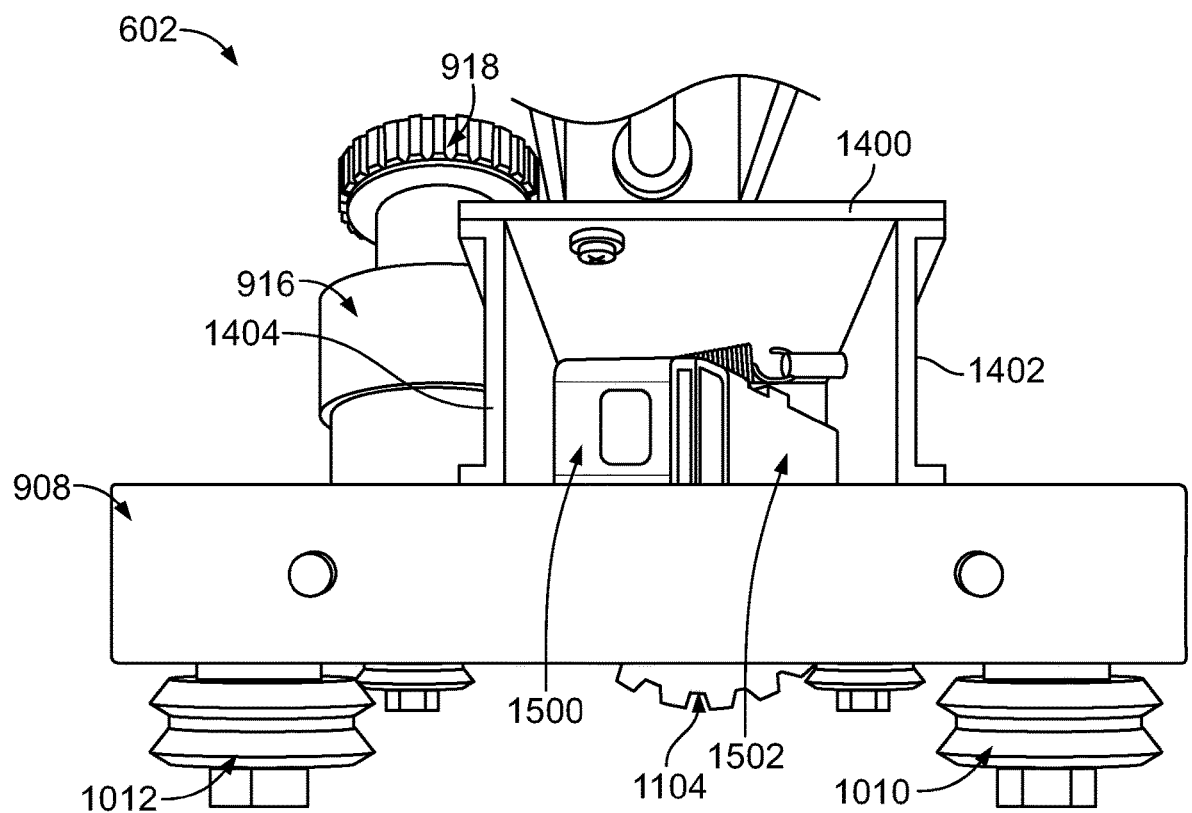
FIG. 15 illustrates a partial right side view of a robotic device, in accordance with an example implementation.

FIG. 15 illustrates a partial right side view of the robotic device 602, in accordance with an example implementation. The robotic device 602 can include a controller 1500 that can be mounted, for example, to the frame base 906. The controller 1500 can include one or more processors or microprocessors and may include data storage (e.g., memory, transitory computer-readable medium, non-transitory computer-readable medium, etc.). The data storage can have stored thereon instructions that, when executed by the one or more processors of the controller 1500, cause the controller 1500 to perform the operations described herein (e.g., moving the robotic device 602 along the rail 604).

In an example, the controller 1500 can be communicatively coupled to a remote control receiver 1502. The remote control receiver 1502 can receive command signals from a remote controller and communicate the command signals to the controller 1500. In response to the command signals, the controller 1500 can send commands to provide power from a battery 1408 shown in FIG. 14 to the worm gear drive motor 920 and/or the cross slide motor 916.

As a result, the main drive gear 1004 can rotate causing the circumferential carriage 900, and thus the robotic device 602, to move along the rack 606 of the rail 604 about a circumference of the curved surface 601 to scan the curved surface 601 via the scanner 608. Further, the cross slide motor 916 can also be actuated to cause the cross slide drive gear 918 to rotate, thereby causing the transversal carriage 902 (i.e., the cross slide 912) to slide transversely (e.g., in a longitudinal direction parallel to a longitudinal axis of the aircraft 100). As the robotic device 602 traverses the curved surface 601, the focal distance of the scanner 608 from the curved surface 601 and its orientation relative to the tracker 500 are maintained without human adjustments during the scan process.

Alternative or in addition to being controllable by a remote controller, the robotic device 602 can be programmed to traverse the curved surface 601 via the rail 604 circumferentially and transversely at a particular speed and in a particular order. For example, the robotic device 602 can be programmed to move circumferentially at a particular speed while the scanner 608 scans the curved surface 601 enabling the tracker 500 to determine coordinates of points of the curved surface 601 in a continuous manner. Alternatively, the robotic device 602 can move to discreet circumferential points along the curved surface 601 and the scanner 608 can scan such circumferential discreet points and then transversal carriage 902 can be actuated to scan points longitudinally while at a particular circumferential discreet point.

In this manner, a 3D point cloud representing coordinates of the points of the curved surface 601 can be generated. The 3D point cloud can be in a Cartesian coordinate format where each point is assigned an X, Y, and Z coordinates relative to an origin point (e.g., where the tracker 500 is positioned). In another example, spherical coordinates can be used where each point in the 3D point cloud comprises, for example: (i) a radial distance from the tracker 500, (ii) a polar angle along the circumference measured from a fixed zenith direction and determined based on a position of the circumferential carriage 900 along the circumference of the curved surface 601, and (iii) an azimuth angle of an orthogonal projection of the point on a reference plane that passes through the origin and is orthogonal to the zenith, measured from a fixed reference direction on that plane and determined based on a position of the transversal carriage 902 relative to the circumferential carriage 900.

Advantageously, as the robotic device 602 is stopped at a particular point as it ascends along the circumference of the curved surface, or as the robotic device 602 descends downward along the circumference, the worm gear arrangement described above prevents the main drive gear 1004 from being back-driven by gravity. Particularly, the friction between the worm screw 1102 and the worm wheel 1104 prevents the worm wheel 1104 from applying a force to the worm screw 1102 that would cause the worm screw 1102 to rotate backward. In examples, for additional safety precautions, a rope 610 shown in FIG. 6 can be used to ensure that the robotic device 602 does not fall off the rail 604. Also, other gear configurations can be used to prevent the main drive gear 1004 from being back-driven.

The flexible track system 600 can also be used to scan an interior curved surface of the lead portion 202 of the section 104 of the aircraft 100. Particularly, segments of the rail 604 can be flipped and then joined such that the rack 606 is facing inward toward a center of the aircraft 100 rather than outward as in FIG. 6. The vacuum cups mentioned above with respect to FIG. 7 can attach the rail 604 to the interior peripheral surface of the lead portion 202 of the section 104. The robotic device 602 can then be actuated to move circumferentially and transversely about the interior peripheral surface and enable the scanner 608 to scan the surface.

Figure 16:
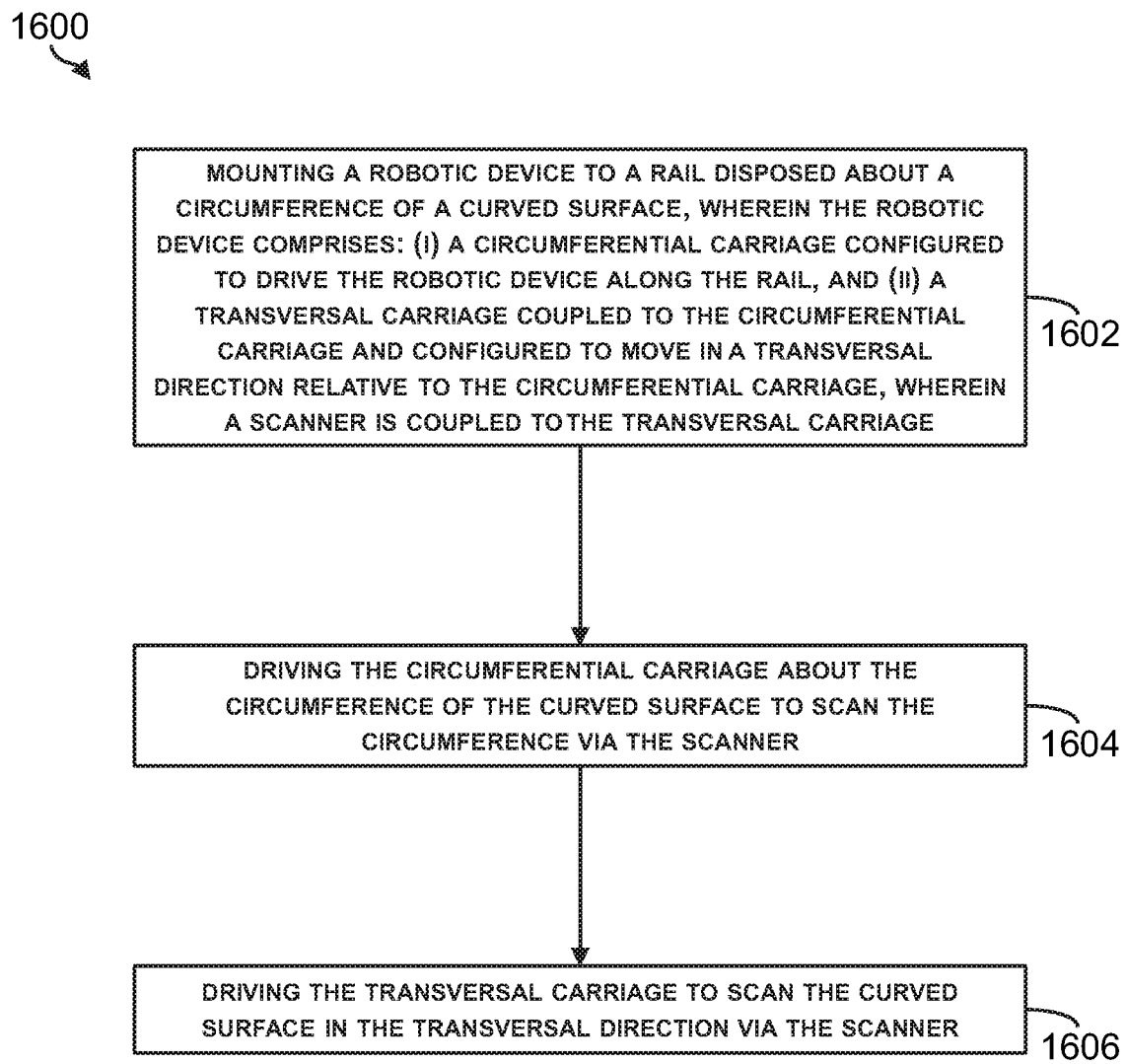
FIG. 16 is a flowchart of a method for scanning a curved surface, in accordance with an example implementation.
Figure 17:
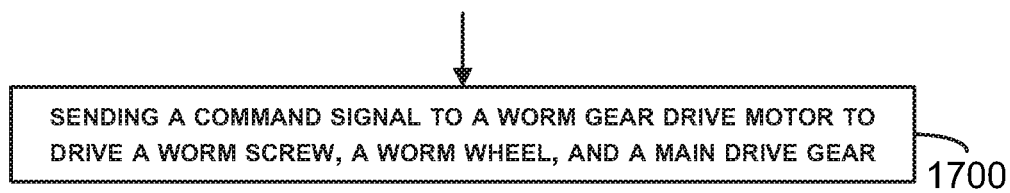
FIG. 17 is a flowchart of additional operations that may be executed and performed with the method of FIG. 16, in accordance with an example implementation.
Figure 18:
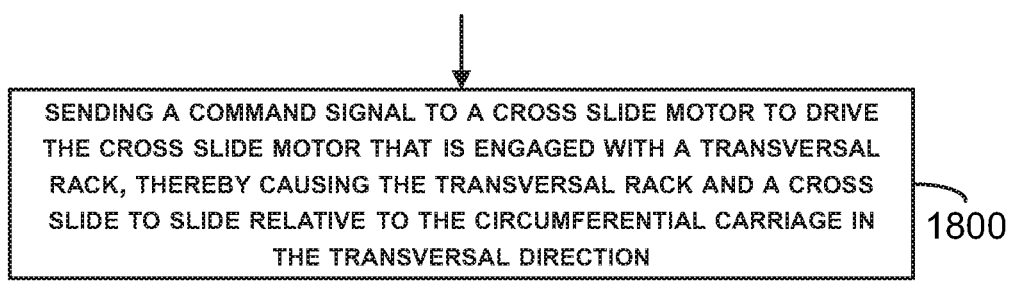
FIG. 18 is a flowchart of additional operations that may be executed and performed with the method of FIG. 16, in accordance with an example implementation.

FIG. 16 is a flowchart of a method 1600 for scanning a curved surface, in accordance with an example implementation. The method 1600 can, for example, be used with the flexible track system 600, the robotic device 602, and the rail 604 described above. Further, FIGS. 17-18 are flowcharts of methods for use with the method 1600.

The method 1600 may include one or more operations, or actions as illustrated by one or more of blocks 1602-1606, 1700, and 1800. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1602, the method 1600 includes mounting the robotic device 602 to the rail 604 disposed about a circumference of the curved surface 601, wherein the robotic device 602 comprises: (i) the circumferential carriage 900 configured to drive the robotic device 602 along the rail 604, and (ii) the transversal carriage 902 coupled to the circumferential carriage 900 and configured to move in a transversal direction relative to the circumferential carriage 900, wherein the scanner 608 is coupled to the transversal carriage 902.

At block 1604, the method 1600 includes driving the circumferential carriage 900 about the circumference of the curved surface 601 to scan the circumference via the scanner 608 (i.e., sending a signal via the controller 1500 to drive the worm gear drive motor 920).

At block 1606, the method 1600 includes driving the transversal carriage 902 to scan the curved surface in the transversal direction via the scanner 608 (i.e., sending a signal via the controller 1500 to drive the cross slide motor 916).

FIG. 17 is a flowchart of additional operations that may be executed and performed with the method 1600, in accordance with an example implementation. As described above, the circumferential carriage 900 comprises: (i) the frame base 906, (ii) the frame 904 mounted to the frame base 906, (iii) the wheels 1006, 1008 coupled to the frame base 906 and configured to engage with the rail 604, (iv) the worm gear drive motor 920 mounted to the frame 904, (v) the worm screw 1102 coupled to the worm gear drive motor 920, (vi) the worm wheel 1104 engaged with the worm screw 1102, and (vii) the main drive gear 1004 coupled to the worm wheel 1104 and configured to engage with the rack 606 disposed on the rail 604. At block 1700, the operation of driving the circumferential carriage 900 about the circumference of the curved surface 601 includes sending a command signal to the worm gear drive motor 920 to drive the worm screw 1102, the worm wheel 1104, and the main drive gear 1004.

FIG. 18 is a flowchart of additional operations that may be executed and performed with the method 1600, in accordance with an example implementation. As described above, the transversal carriage 902 comprises: (i) the cross slide 912 slidably mounted to the circumferential carriage 900, (ii) the transversal rack 914 coupled to the cross slide 912, (iii) the cross slide motor 916 mounted to the circumferential carriage 900, and (iv) the cross slide drive gear 918 coupled to the cross slide motor 916 and having gear teeth engaging with respective teeth of the transversal rack 914. At block 1800, the operation of driving the transversal carriage 902 to scan the curved surface in the transversal direction includes sending a command signal to the cross slide motor 916 to drive the cross slide motor 916 that is engaged with the transversal rack 914, thereby causing the transversal rack 914 and the cross slide 912 to slide relative to the circumferential carriage 900 in the transversal direction.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A robotic device for scanning curved surfaces, the robotic device comprising:
    a circumferential carriage configured to drive the robotic device along a rail configured to be mounted to a curved surface, the circumferential carriage comprising: (i) a frame base, (ii) a frame mounted to the frame base, (iii) one or more wheels coupled to the frame base and configured to engage with the rail, (iv) a worm gear drive motor mounted to the frame, (v) a worm screw coupled to the worm gear drive motor, (vi) a worm wheel engaged with the worm screw, and (vii) a main drive gear coupled to the worm wheel and configured to engage with a rack disposed on the rail; and
    a transversal carriage comprising: (i) a cross slide slidably mounted to the frame of the circumferential carriage, (ii) a transversal rack coupled to the cross slide, (iii) a cross slide motor mounted to the circumferential carriage, and (iv) a cross slide drive gear coupled to the cross slide motor and having gear teeth engaging with respective teeth of the transversal rack to drive the transversal carriage in a transversal direction relative to the circumferential carriage.

2. The robotic device of claim 1, further comprising:
    a scanner mount pivotably mounted to the cross slide and configured to be coupled to a scanner configured to scan the curved surface.

3. The robotic device of claim 1, wherein the circumferential carriage further comprises:
    a retaining base coupled to the frame base via one or more extension springs; and
    one or more respective wheels coupled to the retaining base and configured to engage with the rail.

4. The robotic device of claim 3, wherein the one or more wheels of the frame base and the one or more respective wheels of the retaining base are configured as bearings having grooves configured to engage with chamfered edges of the rail.

5. The robotic device of claim 1, wherein the worm screw and the worm wheel of the circumferential carriage are disposed in a worm gear housing coupled to the frame and the worm gear drive motor, wherein the worm gear drive motor and the worm gear housing are mounted to the frame at an angle, and wherein the circumferential carriage further comprises:
    one or more extension springs coupling the worm gear housing to the frame so as to apply a torque on the main drive gear and maintain engagement of the main drive gear with the rack of the rail.

6. The robotic device of claim 5, further comprising:
a bracket having a first side coupled to the frame base and a second side coupled to the worm gear housing, thereby affixing the worm gear housing to the frame base of the circumferential carriage.

7. A system for scanning a curved surface, the system comprising:
a rail configured to be made of a flexible material to conform to curvature of the curved surface, wherein the rail comprises a rack having teeth;
a plurality of standoff mounts coupled to the rail and spaced along a length of the rail, wherein the plurality of standoff mounts are configured to mount the rail to the curved surface, such that the rail is disposed at a consistent distance from the curved surface; and
a robotic device comprising:
    a circumferential carriage configured to drive the robotic device along the rail, the circumferential carriage comprising: (i) a frame base, (ii) a frame mounted to the frame base, (iii) one or more wheels coupled to the frame base and configured to engage with the rail, (iv) a worm gear drive motor mounted to the frame, (v) a worm screw coupled to the worm gear drive motor, (vi) a worm wheel engaged with the worm screw, and (vii) a main drive gear coupled to the worm wheel and configured to engage with the teeth of the rack of the rail, and
    a transversal carriage comprising: (i) a cross slide slidably mounted to the frame of the circumferential carriage, (ii) a transversal rack coupled to the cross slide, (iii) a cross slide motor mounted to the circumferential carriage, and (iv) a cross slide drive gear coupled to the cross slide motor and having gear teeth engaging with respective teeth of the transversal rack to drive the transversal carriage in a transversal direction relative to the circumferential carriage.

8. The system of claim 7, wherein the plurality of standoff mounts comprise respective vacuum cups configured to attach the plurality of standoff mounts and the rail coupled thereto to the curved surface.

9. The system of claim 7, wherein the rail is divided into multiple rail segments, wherein each two rail segments of the multiple rail segments are connected together via rail connectors respectively coupled to the two rail segments.

10. The system of claim 9, wherein a first rail connector of the rail connectors comprises a bracket having a slot, and wherein a second rail connector of the rail connectors comprises a tab inserted in the slot of the first rail connector to couple the two rail segments.

11. The system of claim 7, further comprising:
a scanner mount pivotably mounted to the cross slide of the transversal carriage.

12. The system of claim 11, further comprising:
a scanner mounted to the scanner mount and configured to scan the curved surface as the robotic device moves along the rail.

13. The system of claim 12, further comprising:
a tracker communicatively coupled to the scanner and configured to track location of the scanner relative to a position of the tracker as the robotic device moves along the rail.

14. The system of claim 7, wherein the circumferential carriage of the robotic device further comprises:
a retaining base coupled to the frame base via one or more extension springs; and
one or more respective wheels coupled to the retaining base and configured to engage with the rail.

15. The system of claim 14, wherein the rail comprises chamfered edges, and wherein the one or more wheels of the frame base and the one or more respective wheels of the retaining base are configured as bearings having grooves configured to received and engage with the chamfered edges of the rail.

16. The system of claim 7, wherein the worm screw and the worm wheel of the circumferential carriage are disposed in a worm gear housing coupled to the frame and the worm gear drive motor, wherein the worm gear drive motor and the worm gear housing are mounted to the frame at an angle, and wherein the circumferential carriage further comprises:
one or more extension springs coupling the worm gear housing to the frame so as to apply a torque on the main drive gear and maintain engagement of the main drive gear with the rack of the rail.

17. The system of claim 16, further comprising:
a bracket having a first side coupled to the frame base and a second side coupled to the worm gear housing, thereby affixing the worm gear housing to the frame base of the circumferential carriage.

18. A method comprising:
mounting a robotic device to a rail disposed about a circumference of a curved surface, wherein the robotic device comprises: (i) a circumferential carriage configured to drive the robotic device along the rail, and (ii) a transversal carriage coupled to the circumferential carriage and configured to move in a transversal direction relative to the circumferential carriage, wherein a scanner is coupled to the transversal carriage;
driving the circumferential carriage about the circumference of the curved surface to scan the circumference via the scanner; and
driving the transversal carriage to scan the curved surface in the transversal direction via the scanner.

19. The method of claim 18, wherein the circumferential carriage comprises: (i) a frame base, (ii) a frame mounted to the frame base, (iii) one or more wheels coupled to the frame base and configured to engage with the rail, (iv) a worm gear drive motor mounted to the frame, (v) a worm screw coupled to the worm gear drive motor, (vi) a worm wheel engaged with the worm screw, and (vii) a main drive gear coupled to the worm wheel and configured to engage with a rack disposed on the rail, and wherein driving the circumferential carriage about the circumference of the curved surface comprises:
sending a command signal to the worm gear drive motor to drive the worm screw, the worm wheel, and the main drive gear.

20. The method of claim 18, wherein the transversal carriage comprises: (i) a cross slide slidably mounted to the circumferential carriage, (ii) a transversal rack coupled to the cross slide, (iii) a cross slide motor mounted to the circumferential carriage, and (iv) a cross slide drive gear coupled to the cross slide motor and having gear teeth engaging with respective teeth of the transversal rack, and wherein driving the transversal carriage to scan the curved surface in the transversal direction comprises:
sending a command signal to the cross slide motor to drive the cross slide motor that is engaged with the transversal rack, thereby causing the transversal rack and the cross slide to slide relative to the circumferential carriage in the transversal direction.

\* \* \* \* \*